United States Patent [19]
Yukutomo et al.

[11] Patent Number: 5,469,352
[45] Date of Patent: Nov. 21, 1995

[54] OPERATION HISTORY DISPLAY DEVICE OF NUMERICAL CONTROL APPARATUS

[75] Inventors: Masashi Yukutomo, Sagamihara; Shigeru Isohata, Hachioji; Osamu Yamazaki, Hino, all of Japan

[73] Assignee: Fanuc Ltd, Yamanashi, Japan

[21] Appl. No.: 211,772

[22] PCT Filed: Aug. 24, 1993

[86] PCT No.: PCT/JP93/01184

§ 371 Date: Apr. 15, 1994

§ 102(e) Date: Apr. 15, 1994

[87] PCT Pub. No.: WO94/06066

PCT Pub. Date: Mar. 17, 1994

[30] Foreign Application Priority Data

Sep. 1, 1992 [JP] Japan .................... 4-233251

[51] Int. Cl.[6] .................. G05B 19/408; G05B 19/409
[52] U.S. Cl. ............... 364/192; 364/474.16; 364/474.22
[58] Field of Search .................... 364/140–147, 364/164, 165, 188–193, 474.01–474.37

[56] References Cited

U.S. PATENT DOCUMENTS

| | | | |
|---|---|---|---|
| 5,212,645 | 5/1993 | Wildes et al. | 364/474.16 |
| 5,224,053 | 6/1993 | Cook | 364/188 |
| 5,297,256 | 3/1994 | Wolstenholme et al. | 364/188 |
| 5,323,325 | 6/1994 | Izumiya | 364/474.16 |
| 5,327,354 | 7/1994 | Tsujimoto | 364/188 |

FOREIGN PATENT DOCUMENTS

| | | | |
|---|---|---|---|
| 53-139074 | 12/1978 | Japan . | |
| 61-15206 | 1/1986 | Japan . | |
| 63-180494 | 7/1988 | Japan . | |
| 63-259702 | 10/1988 | Japan . | |
| 2-287801 | 11/1990 | Japan | 364/474.16 |

*Primary Examiner*—Roy N. Envall, Jr.
*Assistant Examiner*—Steven R. Garland
*Attorney, Agent, or Firm*—Staas & Halsey

[57] ABSTRACT

An operation history display device of a numerical control apparatus by which a fault causing factor can be easily specified. Key input means outputs the key signal of an operation key depressed by an operator to input a command to the numerical control apparatus. Change detection means detects a change of an output signal and outputs the signal to which the change is caused. Operation history control means stores the signal name and the like of the signal to which the change is caused to a history buffer together with a present time output from a timer as history data. Thereafter, display control means displays the history data stored in the history buffer on a display unit in response to a predetermined operation performed by the operator.

7 Claims, 6 Drawing Sheets

5,469,352

OPERATION HISTORY DISPLAY DEVICE OF NUMERICAL CONTROL APPARATUS

FIELD OF THE INVENTION

The present invention relates to an operation history display device of a numerical control apparatus, and more specifically, to an operation history display device of a numerical control apparatus by which the history of I/O signals, operation keys and the like can be simply displayed together with the time thereof.

DESCRIPTION OF THE RELATED ART

Many machine tools each provided with a numerical control apparatus are introduced to manufacturing lines and the like of a factory to enable mass-production of products. Several tens of machine tools each provided with a numerical control apparatus, for example, are disposed in a single manufacturing line in correspondence with each manufacturing process of the products, and thus several tens of numerical control apparatuses are managed by an operator in the same time zone.

Therefore, when an alarm, such as a spindle alarm or the like, is issued by a particular machine tool due to, for example, the break of a tool, the operator first moves to this machine tool. Then, the operator interrupts the machine tool by performing a predetermined operation through the numerical control apparatus provided for the machine tool, removes the alarm indicating the replacement of a tool or the like, and then restarts the machine tool.

When an inexperienced operator performs the operation or when an operator, even if he is an experienced operator, performs the operation in confusion, the operator may perform an inadequate operation. In many cases, this inadequate operation performed by the operator makes a workpiece defective and sometimes damages the machine tool and further an additional alarm may be issued by the machine tools and the like of the following process. Consequently, a problem arises in that a kind of operation performed at a particular time is not recorded and thus it is difficult to specify later a factor by which a fault was caused.

SUMMARY OF THE INVENTION

Taking the above into consideration, an object of the present invention is to provide an operation history display device of a numerical control apparatus which can simply specify a factor by which a fault was caused.

To attain the above object, according to the present invention, there is provided an operation history display device of a numerical control apparatus for displaying the history of I/O signals, operation keys and the like, which comprises a key input means for outputting a key signal of an operation key depressed by an operator to input a command to the numerical control apparatus, a change detection means for detecting a change of a signal such as the key signal and the like and outputting the signal to which the change has been caused, a timer for outputting a present time, an operation history control means for storing the signal name of the signal to which the change has been caused to a history buffer as history data together with the present time, and a display control means for displaying the history data stored in the history buffer on a display unit in response to a predetermined operation performed by the operator.

First, the key input means outputs the key signal of an operation key depressed by the operator to input a command to the numerical control apparatus. The change detection means detects the change of an output signal and outputs a signal to which the change is caused. The operation history control apparatus stores the signal name and the like of the signal to which the change is caused to the history buffer together with a present time output from the timer as history data. Thereafter, the display control means displays the history data stored in the history buffer to the display unit in response to a predetermined operation performed by the operator.

DESCRIPTION OF THE PREFERRED EMBODIMENTS

An embodiment of the present invention will be described below with reference to the drawings.

Figure 2:
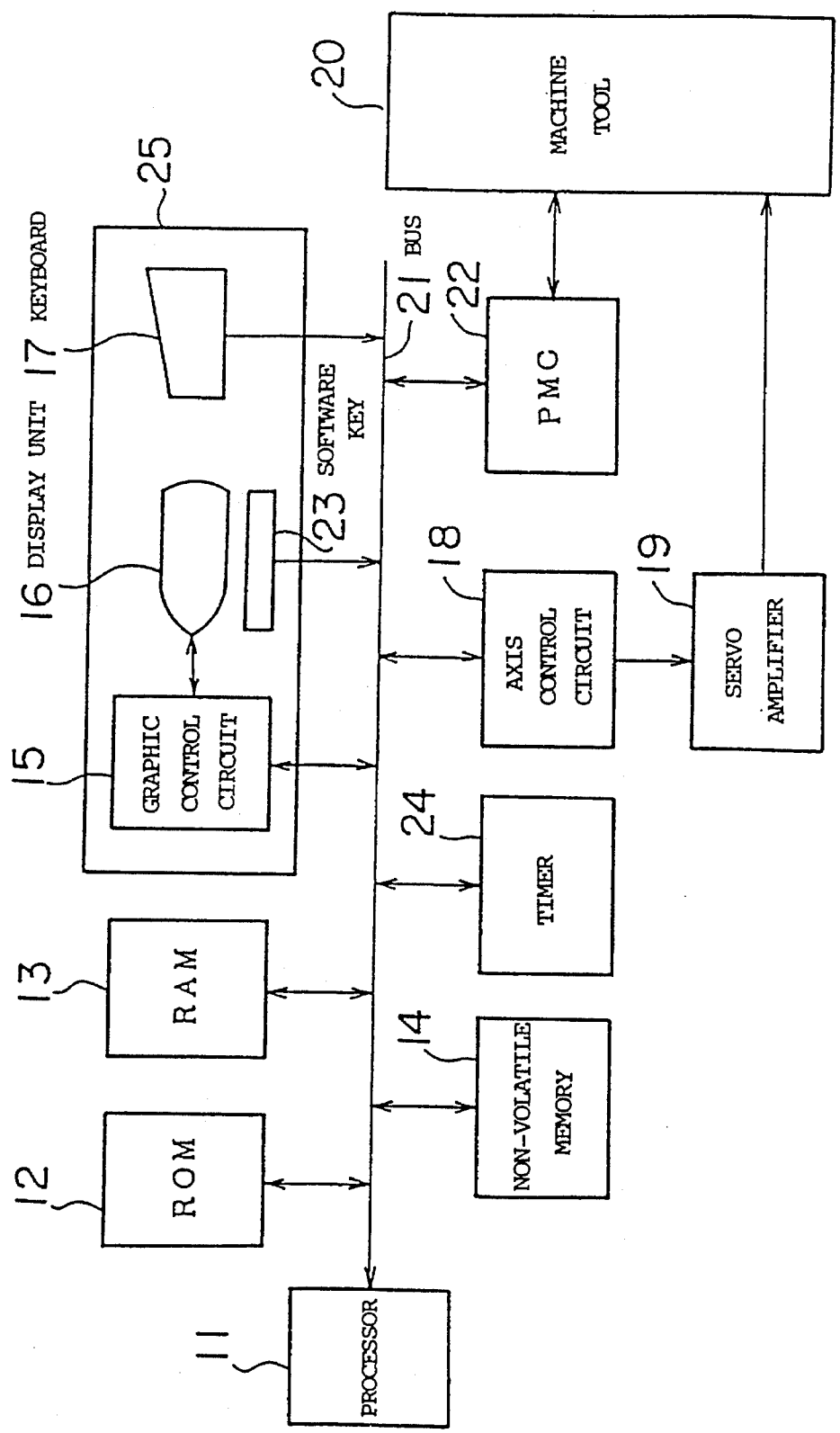
FIG. 2 is a block diagram showing the entire arrangement of a numerical control apparatus.

FIG. 2 is a block diagram showing the entire arrangement of a numerical control apparatus embodying the present invention.

A processor 11 controls the numerical control apparatus as a whole in accordance with a system program stored in a ROM 12. The ROM 12 is comprised of an EPROM or EEPROM. A RAM 13 is comprised of an SRAM or the like and stores various kinds of data or I/O signals. A non-volatile memory 14 is comprised of a CMOS which stores history data, machining programs, macros, parameters, amounts of pitch error correction, amounts of tool correction, and the like, which must be maintained operative even after a power supply is cut off, and thus is supplied with power from a battery not shown.

A graphic control circuit 15 converts a digital signal to a display signal and applies the same to a display unit 16. The display unit 16 is comprised of a CRT or liquid crystal display unit. When a machining program is created by an interactive system, the display unit 16 displays configurations, machining conditions and the like thereon. When the processor 11 executes an image display processing program stored in the ROM 12 with respect to the machining program stored in the non-volatile memory 14, the above digital signal is supplied to the graphic control circuit 15. A timer 24 measures time and date and outputs them as time data.

A keyboard 17 is comprised of cursor keys, configuration factor keys and numerical value keys and the like, and necessary graphic data and machining data are input using these keys.

An axis control circuit 18 receives an axis movement command from the processor 11 and outputs the axis command to a servo amplifier 19. On receiving the movement command, the servo amplifier 19 drives the servo motors of a machine tool 20. These components are interconnected through a bus 21.

When the machining program is executed, a programmable machine controller (PMC) 22 receives a T function signal (tool selection command) and the like through the bus 21. Then, the PMC 22 processes this signal using a sequence program and outputs a signal as an operation command to thereby control the machine tool 20. Further, the PMC 22 receives a status signal from the machine tool 20 and subjects the status signal to a sequence processing and transfers a necessary input signal to the processor 11 through the bus 21.

Further, a software key 23 whose function is changed according to the system program or the like is connected to the bus 21. The software key 23 is disposed on a CRT/MDI panel 25 together with the display unit 16 and the keyboard 17.

An input screen of interactive type data to be displayed on the display unit 16 is stored in the ROM 12. When a machining program is created, the operating locus and the like of a tool as a whole is displayed on the input screen of the interactive type data as a background animation. Further, the display unit 16 displays in a menu format jobs or data which can be set through the input screen. A menu item to be selected from the menu is indicated through the software key 23 disposed on the lower portion of the screen in correspondence to the menu. The software key 23 has a different meaning depending upon each screen. Note, the history data are stored in the RAM 13 or the non-volatile memory 14 together with time data output from the timer 24 and various kinds of interactive data are also stored therein.

Input data is processed by the processor 11 to create a machining program. The thus created program data is sequentially displayed on the display unit 16 which is used in an interactive system as a background animation. In addition, the machining program stored in the non-volatile memory 14 is also executed when a machining simulation of the machine tool 20 is performed and displayed as a foreground animation.

Figure 1:
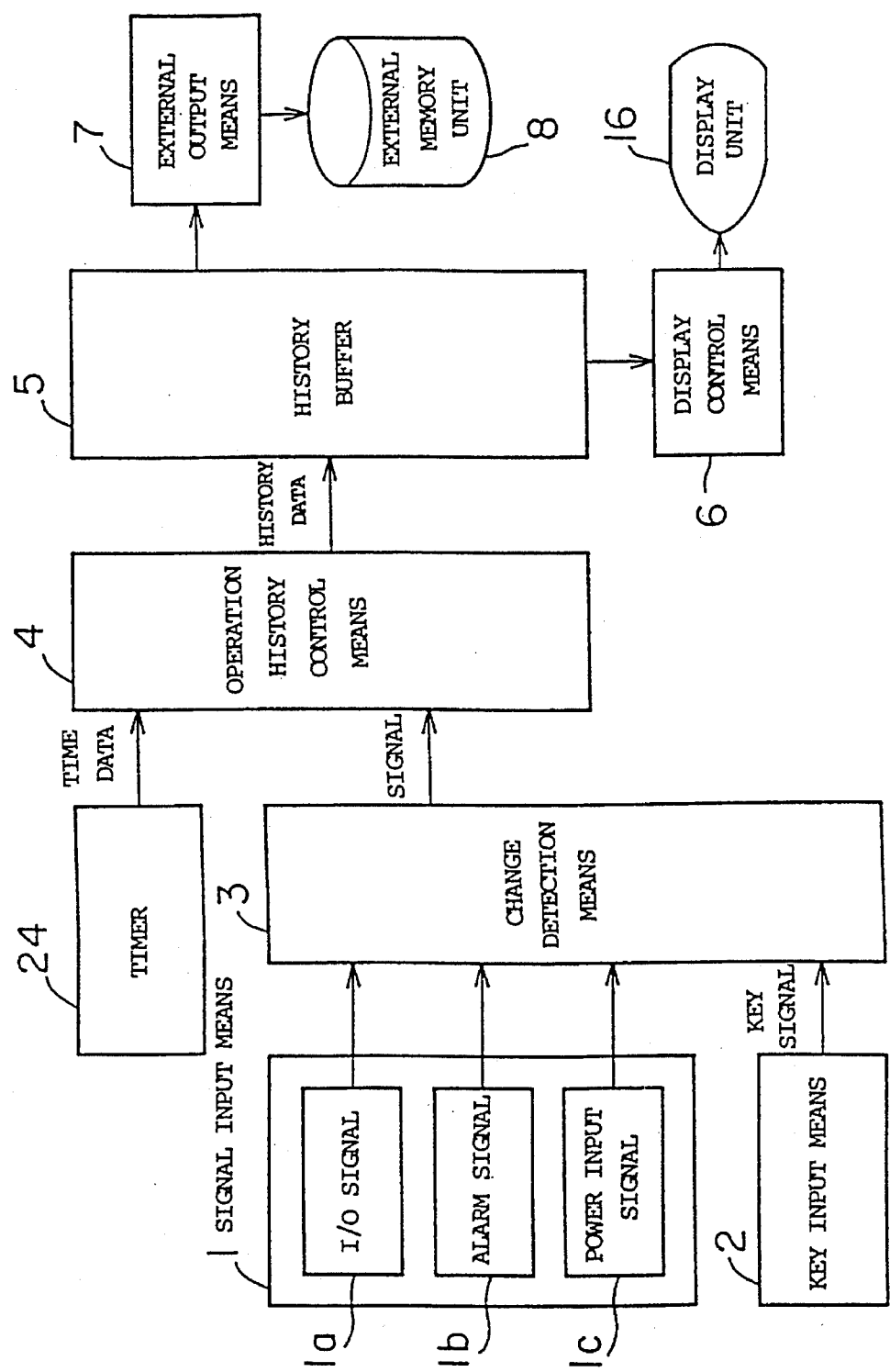
FIG. 1 is a diagram showing the entire arrangement of the present invention.

FIG. 1 is a diagram showing the entire arrangement of the present invention. An operation history display device of the present invention is comprised of the timer 24, signal input means 1, key input means 2, change detection means 3, operation history control means 4, a history buffer 5, display control means 6, the display unit 16, external output means 7, and external memory unit 8.

The signal input means 1 inputs respective signals of an I/O signal 1a, an alarm signal 1b and a power input signal 1c and outputs these signals to the change detection means 3. The key input means 2, which corresponds to the keyboard 17 and the software key 23 shown in FIG. 2, inputs data to be applied to the numerical control apparatus through an operation key depressed by the operator and outputs the key signal of the depressed operation key to the change detection means 3. The change detection means 3 monitors signals output from the signal input means 1 and the key input means 2 and outputs a signal whose status is changed.

The operation history control means 4 creates the history data, to be described later, based on a signal output from the change detection means 3 together with time data at which the signal is output and stores the history data in the history buffer 5. The history buffer 5 corresponds to the non-volatile memory 14. The display control means 6, which corresponds to the graphic control circuit 15, displays the history data stored in the history buffer 5 on the display unit 16. The external output means 7 outputs the history data stored in the history buffer 5 to the external memory unit 8 in response to a command from the operator. The external memory unit 8 is comprised of, for example, a floppy disk unit, a hard disk unit, a personal computer or a numerical control apparatus connected to a communication line, and the like.

Note, the signal input means 1, change detection means 3, operation history control means 4 and external output means 7 have functions realized by the history control program of the system programs stored in the ROM 12 when the history control program is executed by the processor 11. Further, the I/O signal 1a includes an output signal to be output to the machine tool 20 through the PMC 22 and an input signal to be input from the machine tool 20 through the PMC 22.

Next, operation of the operation history display device of the present invention will be described.

First, when power is supplied to the numerical control apparatus, the power input signal 1c is produced. On receiving the power input signal 1c, the change detection means 3 outputs this signal to the operation history control means 4 as it is. The operation history control means 4 receives the power input signal 1c and receives time data from the timer 24 to create the history data, to be described later, and stores the history data in the history buffer 5.

Further, when an output signal to be output to the machine tool 20 and an input signal to be input from the machine tool 20 are produced, they are output to the change detection means 3 as the I/O signal 1a. In the same way, when data is input through an operation key depressed by the operator, the data input is output to the change detection means 3 as a key signal. The operation history control means 4 receives the I/O signal 1a or the key signal and receives time data from the timer 24 to create the history data, to be described later, and stores the history data to the history buffer 5.

Further, when an NC alarm such as an over-traveling alarm, spindle alarm or the like is produced by the machine tool 20, it is output to the change detection means 3 as the alarm signal 1c. The operation history control means 4 receives the alarm signal 1c and receives time data from the timer 24 to create the history data, to be described later, and stores the history data in the history buffer 5.

When any fault is caused thereafter, the operator applies a command to the display control means 6 by performing a predetermined operation so that the history data stored in the history buffer 5 can be displayed on the display unit 16. Note, it is also possible that a command is applied to the external output means 7 to output the history data stored in the history buffer 5 to the external memory unit 8, when necessary.

As described above, when a fault is caused, a factor causing the fault can be specified in a short time by the operation performed by the operator. Further, the analysis of the history data of each fault stored in the external memory unit 8 enables to specify the overall factors of the faults, including operation and the like, which are liable to be taken by mistake when a fault is caused.

Figure 3:
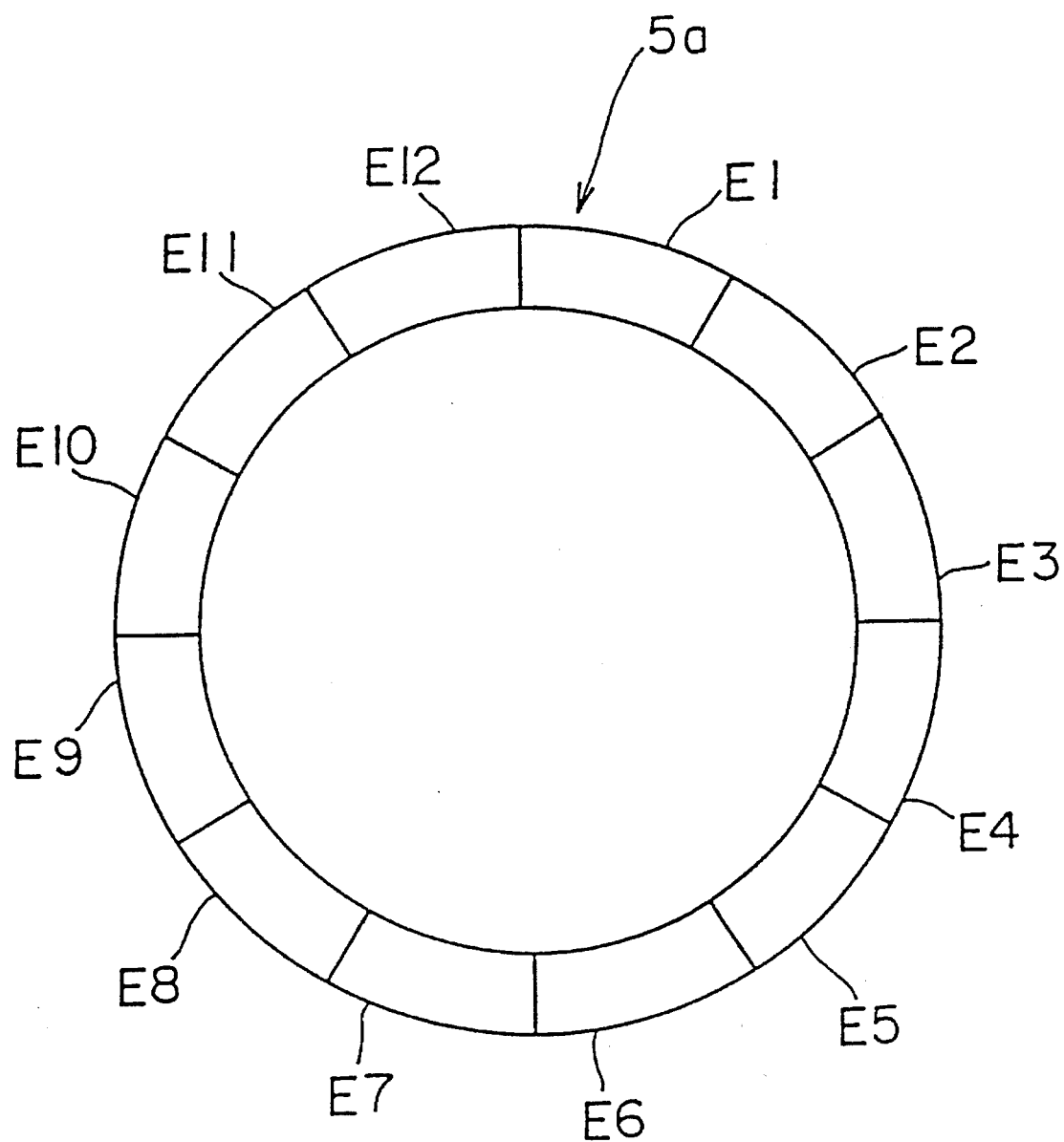
FIG. 3 is a schematic diagram showing the structure of a ring buffer.

FIG. 3 is a schematic diagram showing the structure of a ring buffer. The history data output from the operation history control means 4 shown in FIG. 1 is stored in the history buffer 5. FIG. 3 is a diagram showing an example of the history buffer 5.

In FIG. 3, the ring buffer 5a is comprised of 12 elements E1–E12 which are annularly connected to each other. When the history data are output from the operation history control means 4, the first one of the history data is stored in the element E1 at first, and data following the first one of the history data are sequentially stored in the elements E2, E3, ... until the element E12 stores the data. Then, the next history data is stored in the element E1 by overwriting the data currently stored in element E1 in it. As described above, each time a piece of the history data is output from the operation history control means 4, it is stored in an element E1, E2, ... E12 in a clockwise sequence.

Since the history buffer 5 is comprised of the annular buffer as described above, the buffer can be easily managed and the number of the history data corresponding to a predetermined number of the elements (12 elements in FIG. 3) can be stored at all times. Further, as described later, since the history data stored in the ring buffer 5a is displayed on the display unit 16 in the sequence of clockwise or counterclockwise, a sequence in which the history data is displayed can be easily changed. It should be noted that the number of the elements in the ring buffer 5a is not limited to 12 but the ring buffer 5a can be comprised of a predetermined number of the elements in accordance with, for example, the capacity of the nonvolatile memory 14 shown in FIG. 2.

Figure 4:
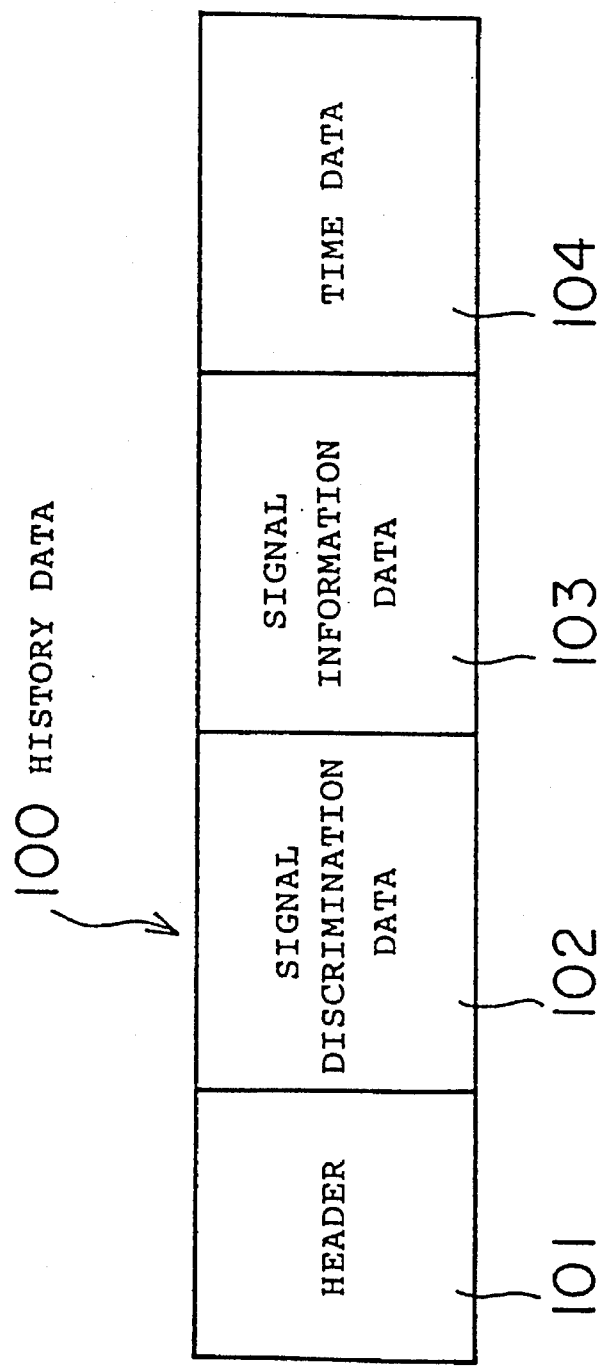
FIG. 4 is a diagram showing an example of a data format of history data stored in the ring buffer.

FIG. 4 is a diagram showing an example of a data format of the history data stored in the ring buffer, wherein the history data 100 is comprised of a header 101, signal discrimination data 102, signal information data 103 and time data 104.

The header 101 includes information for discriminating a kind of history data 100. More specifically, as shown in FIG. 1, the four kinds of signals, i.e., the I/O signal 1a, alarm signal 1b, power input signal 1c and key signal are sequentially input to the change detection means 3 and the operation history control means 4. The header 101 discriminates to which of these four kinds of the signals an input signal corresponds.

The signal discrimination data 102 includes information for discriminating a kind of a signal obtained by further classifying each of the above four kinds of signals. For example, in the case of the I/O signal 1a, the signal discrimination data 102 includes a signal number assigned to each of input signals and output signals, and in the case of the alarm signal 1b, the signal discrimination data 102 includes a number of each of alarm signals which are classified into predetermined kinds.

The signal information data 103 includes the actual data of the above four kinds of the signals. More specifically, the key signal stores the data of a depressed operation key. For example, when an operator depresses a character key "A" on the keyboard 17, the key signal stores data corresponding to a character "A". Note, the alarm signal 1b stores alarm numbers.

The time data 104 includes the time and date when a signal is input, which is supplied from the timer 24.

Since the four kinds of the input signals are classified and the actual data and time data of the signals are stored in the history buffer 5 as the history data 100 as described above, it can be easily checked when and what kind of operation an operator performed and what kind of a signal was produced at that time. Therefore, a factor by which a fault is caused can be specified in a short time. Note, the signal information data 103 or the time data 104 can be omitted, if this data is not necessary. Since these four kinds of numerical value data, i.e., the header 101, signal discrimination data 102, signal information data 103 and time data 104, are converted into binary form and then stored in the history buffer 5, the area of the non-volatile memory 14 occupied by the data can be restricted.

Figure 5:
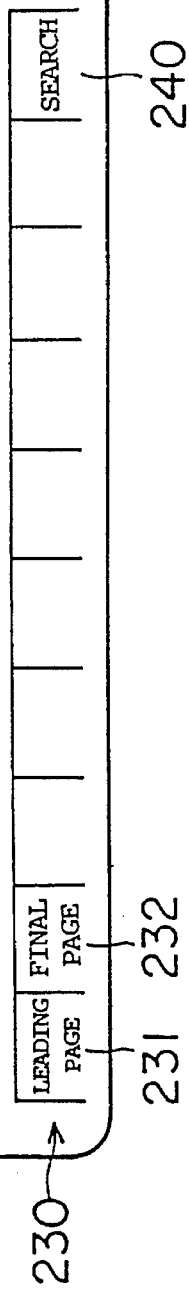
FIG. 5 is a diagram showing an example of history data shown on display unit.

FIG. 5 is a diagram showing an example of the history data shown on the display unit. Note, a display screen 16a is displayed on the display unit 16 shown in FIG. 2.

In FIG. 5, 30 pieces of the history data are displayed on the display screen 16a in 10 rows×3 columns and a number (shown as "No.") 1 to a number 30 are sequentially allocated to the history data from the upper left data to the lower right data and the history data (shown as "DATA") is displayed on the right side of each number. The signal information data 103 shown in FIG. 4 is displayed in the history data.

Nos. 1 and 2 show a date and time when power was supplied and No. 3 shows that the operator depressed the "PROG" key of the keyboard 17. Further, No. 8 to No. 10 show that the alarm signal 1b of a kind "P/S0010" was produced on the date and time indicated by Nos. 9 and 10 by inverting the display thereof. Since the inverted display is employed when an NC alarm is produced, a fault causing factor can be more easily specified.

The display screen 16a displays a software key 230 located on the lower portion thereof which is a command key through which the operator can display other history data. This software key 230 can be commanded through the corresponding software key 23 shown in FIG. 2 and is comprised of 10 command keys 231–240 whose functions are changed depending upon an image screen to be processed. FIG. 5 shows a leading-page-display command key 231, a final-page-display command key 232 and a search command key 240 as the command keys 231–240.

The leading-page-display command key 231 commands to sequentially forwardly display the history data stored in the leading element of the history buffer 5 shown in FIG. 3 as No. 1. The final-page-display command key 232 commands to sequentially backwardly display the history data stored in the final element of the history buffer 5 as No. 30. The search command key 240 commands to search a signal name and the like designated by the operator and display them as No. 1 in the sequence in which they are stored in the history buffer 5.

Therefore, the operator can display desired history data on the display screen 16a by inputting a command through any one of the leading-page-display command key 231, final-page-display command key 232 and search command key 240. Further, the operator also can display desired history data on the display screen 16a by inputting a command through a next-page-display command key or previous-page-display command key disposed on the keyboard 17, when necessary.

Figure 6:
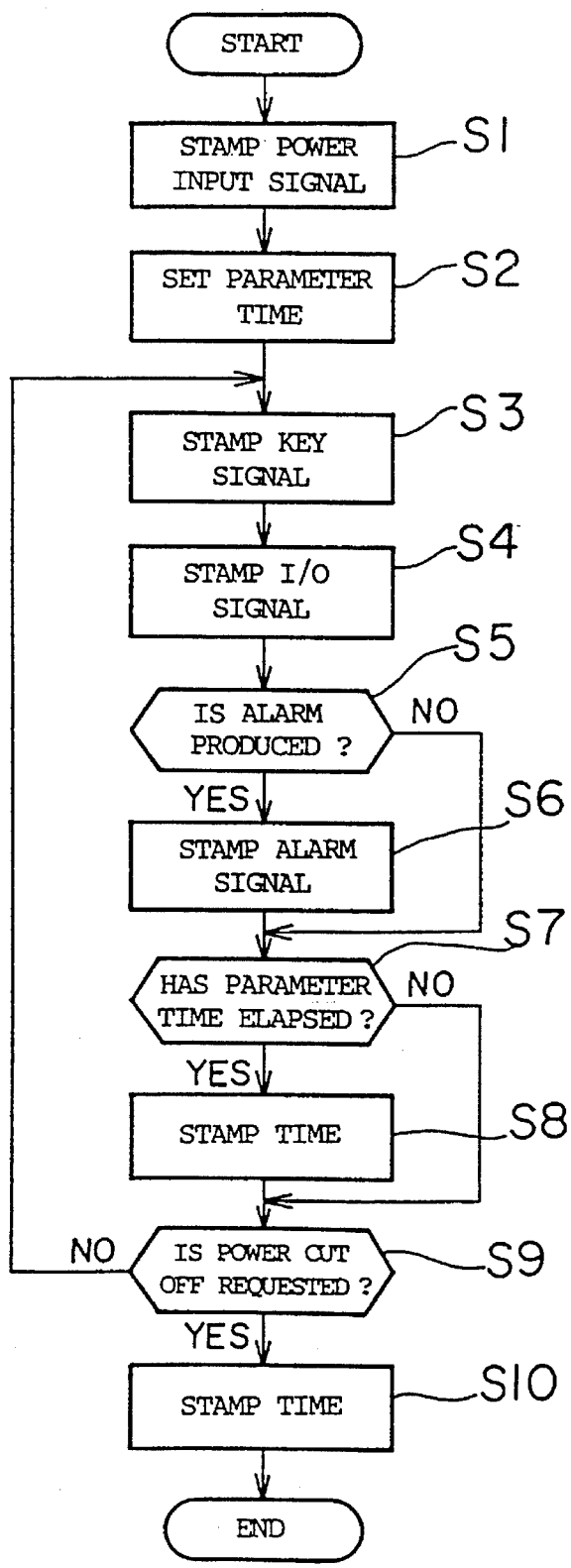
FIG. 6 is a flowchart showing a sequence when an operation history display device is operated.

FIG. 6 is a flowchart showing a sequence for executing the operation history display device, wherein numerals prefixed with an "S" indicate numbers of steps. Note, in this flowchart, the operation in which the operation history control means 4 inputs various kinds of signals, creates the history data 100 shown in FIG. 4 together with the time data from the timer 24 and stores it in the history buffer 5 is simply referred to as a "stamp".

[S1] The power input signal 1c is stamped, that is, the power input signal 1c which is produced when power is supplied to the numerical control apparatus is stamped.

[S2] A parameter time is set. Specifically, a time set to a parameter is set in the operation history control means 4 and a present time input from the timer 24 is set in the operation history control means 4 as a start time.

[S3] A key signal is stamped, that is, when the operator inputs data through the keyboard 17 or software key 23, the key signal corresponding to the operation key depressed by the operator is stamped.

[S4] The I/O signal 1a is stamped, that is, when an input signal or output signal is transferred between the numerical control apparatus and the machine tool 20, the signal is stamped.

[S5] Whether an alarm is produced or not is determined. Specifically, whether the alarm signal 1b is produced from the machine tool 20 or not is determined, and if the alarm 1b is produced (YES), the flow goes to step S6 and if not (NO), the flow goes to step S7.

[S6] The alarm signal 1b is stamped.

[S7] It is determined whether any one of the key signal at step S3, the I/O signal 1a at step S4 and the alarm signal 1b at step S6 is produced and whether the parameter time has elapsed. Specifically, it is determined whether any one of these signals is produced and whether the parameter has elapsed from the start time set at step S2. For example, when the start time is "9 o'clock 0 minute 0 second" and the parameter time is "10 minutes 0 second", if a present time is past "9 o'clock 10 minutes 0 second", it is determined that the parameter time has elapsed. If the parameter time has elapsed (YES), the flow goes to step S8, and if not, the flow goes to step S9.

[S8] Only the time data from the timer 24 is stamped. Further, a time obtained by adding the parameter time with the start time is newly set. For example, the start time is set to "9 o'clock 10 minutes 0 second" in the above example.

[S9] Whether a power supply is required to be cut off or not is determined. If it is required (YES), the flow goes to step S10, and if not (NO), the step returns to step S3.

[S10] Only the time data from the timer 24 is stamped and then the power supply to the numerical control apparatus is cut off.

Therefore, when the I/O signals 1a are changed or the operator inputs data through the keyboard 17 or software key 23, the signal names and the operation keys depressed by the operator are stored in the history buffer 5 as the history data in the sequence of input together with the time data thereof. Then, since the display control means 4 displays the history data stored in the history buffer 5 through a predetermined operation performed by the operator, a factor by which a fault is caused can be specified in a short time. Further, since the history buffer 5 is comprised of the non-volatile memory 14 supplied with the power from the battery, even if an unexpected accident such as a power breakdown or the like arises, the history data is not lost.

Although the history data is stored in the history buffer 5 after the data has been converted into the binary form in the above description, it can be stored in other data format such as a character form or the like.

Further, although the history buffer 5 is comprised of the non-volatile memory 14, it can be comprised of the RAM 13.

Further, although the history buffer 5 is comprised of the ring buffer 5a, it can be arranged as a usual buffer.

Although the signal name, date and time of a signal with which an alarm is produced are inversely displayed, they can be displayed by other means for specifying a location where the alarm is produced such as a highlighted display or the like.

As described above, according to the present invention, since the history of I/O signals, operation keys and the like are stored in the history buffer together with the time data thereof and displayed on the display unit when necessary, a factor by which a fault is caused can be specified in a short time when the occurrence of the fault is notified by an alarm.

We claim:

1. An operation history display device of a numerical control apparatus for displaying a history of numerical control apparatus operational signals, comprising:

input means for inputting a numerical control operational signal to said numerical control apparatus;

change detection means for detecting a change of said numerical control operational signal and outputting the changed signal;

a timer for outputting a present time;

operation history control means for receiving the changed signal output from the change detection means and the present time from the timer and creating history data of the changed signal;

a history buffer for storing a name of the changed signal and said present time in a history buffer as history data; and display control means for displaying said history data stored in said history buffer on a display unit in response to a predetermined operation performed by the operator.

2. An operation history display device of a numerical control apparatus as recited in claim 1, wherein said input means for inputting a numerical control operational signal comprises a signal input means for inputting at least one of an I/O signal, an alarm signal, and a power input signal.

3. An operation history display device of a numerical control apparatus as recited in claim 1, further comprising external output means for outputting said history data stored in said history buffer to an external memory unit.

4. An operation history display device of a numerical control apparatus as recited in claim 1, wherein said history buffer is comprised of a non-volatile memory.

5. An operation history display device of a numerical control apparatus as recited in claim 1, wherein said history buffer is comprised of a ring buffer.

6. An operation history display device of a numerical control apparatus as recited in claim 1, wherein said history data is converted to binary form and stored in said history buffer.

7. An operation history display device as recited in claim 1, wherein said input means comprises a key input means for inputting a signal from an operation key depressed by an operator.

* * * * *